US010588168B2

(12) United States Patent
Liu et al.

(10) Patent No.: US 10,588,168 B2
(45) Date of Patent: Mar. 10, 2020

(54) PEER-TO-PEER TRANSMISSION PAUSE INDICATION

(71) Applicant: Apple Inc., Cupertino, CA (US)

(72) Inventors: Yong Liu, Campbell, CA (US); Christiaan A. Hartman, San Jose, CA (US); Guoqing Li, Cupertino, CA (US); Lawrie Kurian, San Jose, CA (US); Peter N. Heerboth, San Jose, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 15/926,016

(22) Filed: Mar. 20, 2018

(65) Prior Publication Data

US 2018/0332643 A1 Nov. 15, 2018

Related U.S. Application Data

(60) Provisional application No. 62/506,427, filed on May 15, 2017.

(51) Int. Cl.
| H04W 76/14 | (2018.01) |
| H04W 76/27 | (2018.01) |
| H04L 12/825 | (2013.01) |
| H04W 52/02 | (2009.01) |
| H04W 36/00 | (2009.01) |
| H04W 8/00 | (2009.01) |
| H04W 84/18 | (2009.01) |
| H04W 84/12 | (2009.01) |
| H04W 88/06 | (2009.01) |

(52) U.S. Cl.
CPC .......... *H04W 76/14* (2018.02); *H04L 47/266* (2013.01); *H04W 52/0229* (2013.01); *H04W 76/27* (2018.02); *H04W 8/005* (2013.01); *H04W 36/0022* (2013.01); *H04W 52/0254* (2013.01); *H04W 84/12* (2013.01); *H04W 84/18* (2013.01); *H04W 88/06* (2013.01)

(58) Field of Classification Search
None
See application file for complete search history.

(56) References Cited

U.S. PATENT DOCUMENTS

| 5,890,054 A * | 3/1999 | Logsdon | H04W 76/50 455/11.1 |
| 9,426,222 B2 | 8/2016 | Wang | |
| 9,479,983 B2 | 10/2016 | Konrad | |
| 2005/0239451 A1* | 10/2005 | Periyalwar | H04W 52/383 455/425 |
| 2012/0051252 A1* | 3/2012 | Iwao | H04L 45/18 370/252 |
| 2015/0271085 A1* | 9/2015 | Nakajima | H04L 45/14 370/465 |
| 2016/0374100 A1* | 12/2016 | Das | H04W 28/24 |
| 2018/0006896 A1 | 1/2018 | MacNamara | |

* cited by examiner

*Primary Examiner* — Anh Ngoc M Nguyen
(74) *Attorney, Agent, or Firm* — Kowert Hood Munyon Rankin and Goetzel PC; Jeffrey C. Hood; Brian E. Moore

(57) ABSTRACT

In some embodiments, one or more wireless stations operate to configure direct communication with one or more neighboring mobile stations, e.g., direct communication between the wireless stations without utilizing an intermediate access point. Embodiments of the disclosure relate to a mechanism for a wireless station to transmit a pause indication to one or more neighboring peer wireless stations, indicating a pause in direct communication.

20 Claims, 10 Drawing Sheets

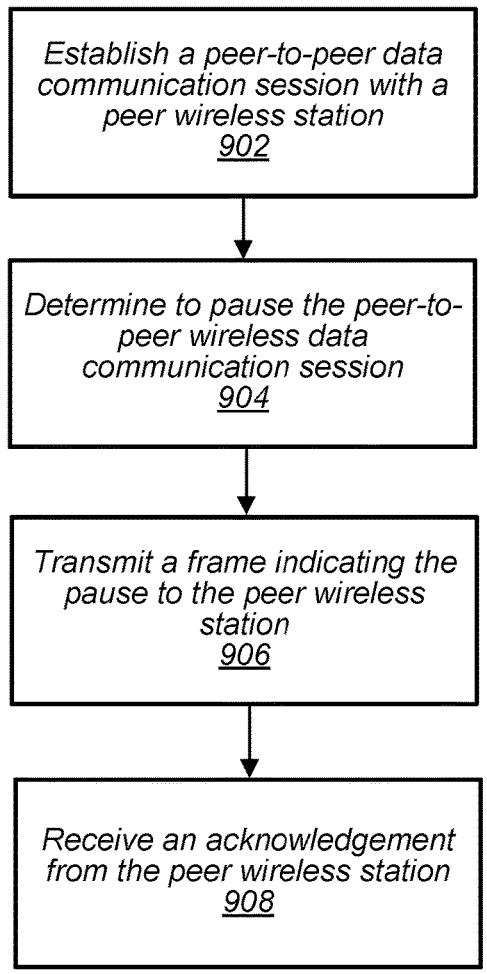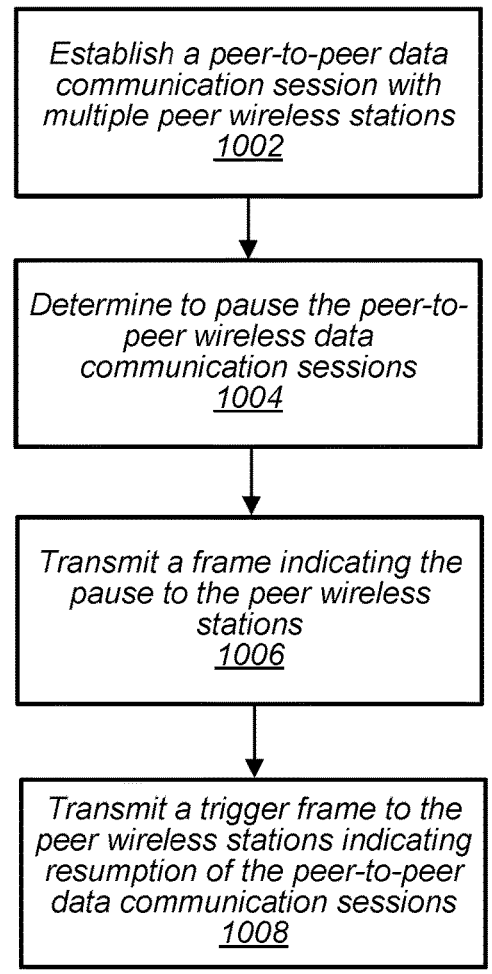
FIG. 9
FIG. 10

PEER-TO-PEER TRANSMISSION PAUSE INDICATION

PRIORITY DATA

This application claims benefit of priority to U.S. Provisional Application Ser. No. 62/506,427, titled "Peer-to-Peer Transmission Pause Indication", filed May 15, 2017, by Yong Liu, Christiaan A. Hartman, Guoqing Li, Lawrie Kurian, Peter N. Heerboth, and Su Khiong Yong, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in the setup and coordination of the communication between such devices.

SUMMARY

Some embodiments described herein relate to systems and methods for peer wireless stations (e.g., wireless stations configured to communicate with neighboring wireless stations without utilizing an intermediate access point) to trigger service discovery over a first interface via service advertisement over a second interface.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with one or more neighboring mobile stations, e.g., direct communication between the wireless stations without utilizing an intermediate access point. Embodiments of the disclosure relate to a mechanism for peer devices to transmit a pause indication to one or more neighboring peer wireless stations.

In some embodiments, the communications may be performed via a peer-to-peer wireless communications protocol, such as Neighbor Awareness Networking (NAN). Thus, embodiments of the disclosure also relate to a NAN device transmitting a pause indication to one or more neighboring peer wireless stations.

In some embodiments, a wireless station may be configured to perform a method to establish, with a peer wireless station, a peer-to-peer data communication session and determine to pause the peer-to-peer data communication session. The wireless station may be configured to transmit a frame indicating the pause to the peer wireless station and receive an acknowledgement from the peer wireless station. In some embodiments, the frame may include a transmission pause field and/or a time duration field. The time duration field may indicate a length of the pause in the peer-to-peer data communication session. In some embodiments, the frame may be a Wi-Fi control frame or a Wi-Fi management frame. In some embodiments, the wireless station may be configured to transmit a trigger frame to the peer wireless station to indicate resumption of the peer-to-peer data communication session. In some embodiments, the trigger frame may be a Wi-Fi control frame or a Wi-Fi management frame.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 9 illustrates a block diagram of an example method for pausing a peer-to-peer data communication session, according to some embodiments.

FIG. 10 illustrates a block diagram of an example method for pausing multiple peer-to-peer data communication sessions, according to some embodiments.

Figure 1:
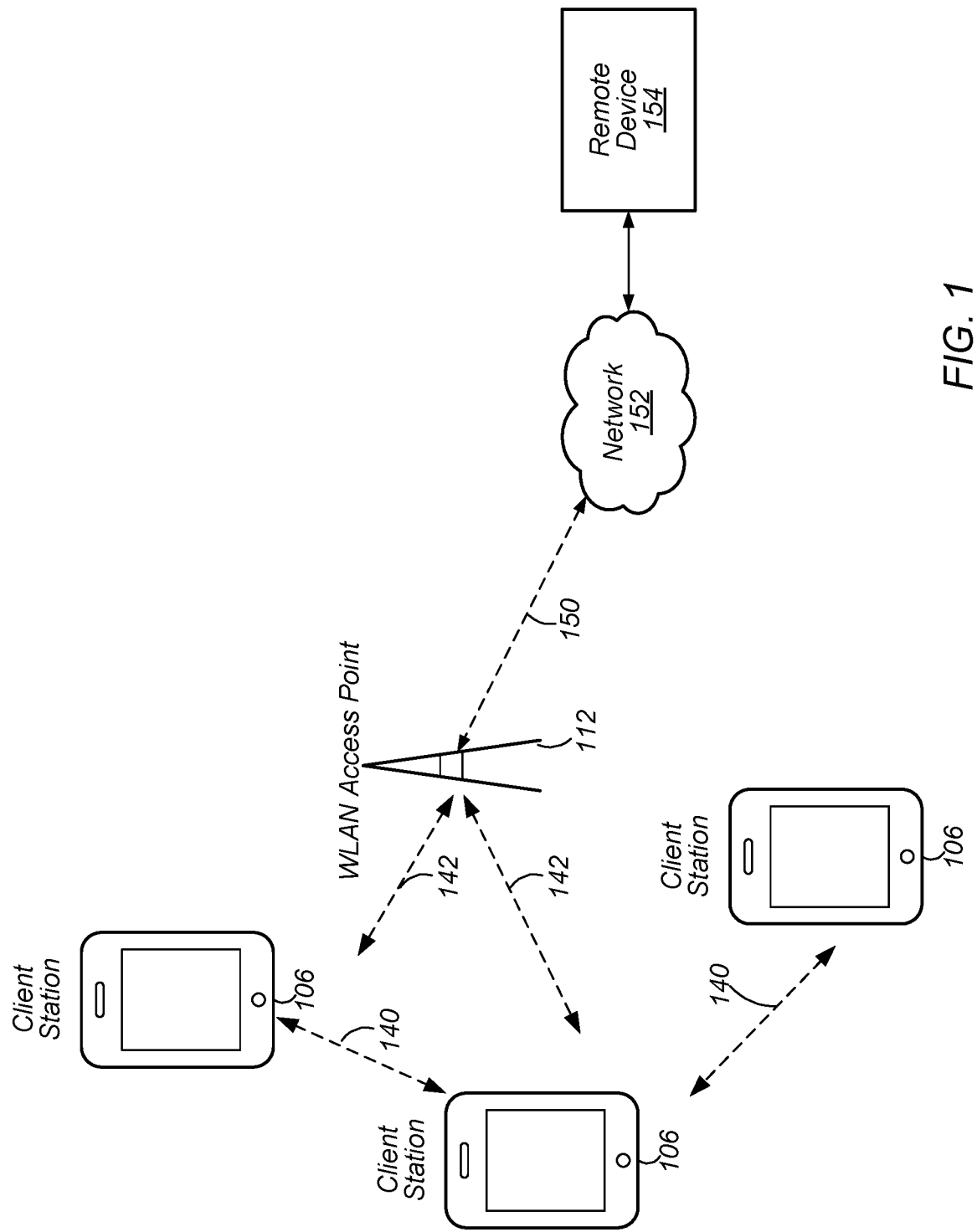
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to establish, with a peer wireless device, a peer-to-peer data communication session and determine to pause the peer-to-peer data communication session. The wireless device 106 may be configured to transmit a frame indicating the pause to the peer wireless device and receive an acknowledgement from the peer wireless device. In some embodiments, the frame may include a transmission pause field and/or a time duration field. The time duration field may indicate a length of the pause in the peer-to-peer data communication session. In some embodiments, the frame may be a Wi-Fi control frame or a Wi-Fi management frame. In some embodiments, the wireless device 106 may be configured to transmit a trigger frame to the peer wireless device to indicate resumption of the peer-to-peer data communication session. In some embodiments, the trigger frame may be a Wi-Fi control frame or a Wi-Fi management frame.

Figure 2:
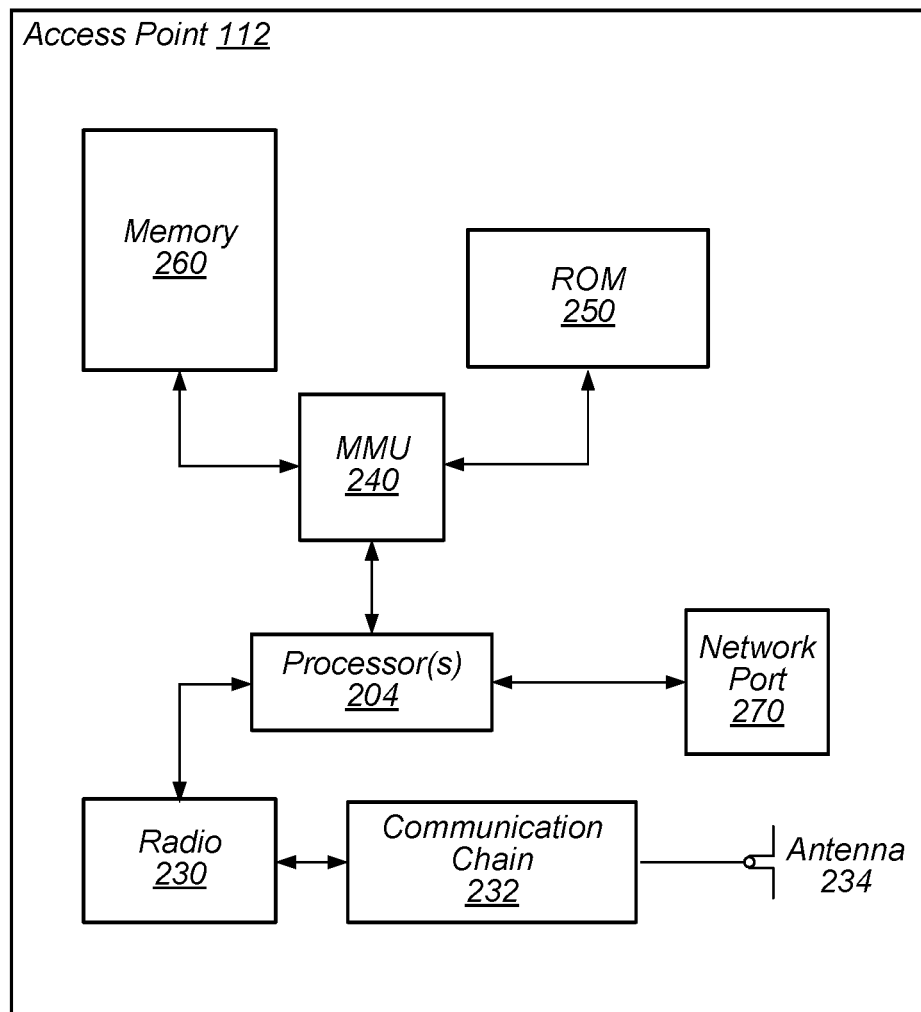
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 that may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to establish, with a peer wireless station, a peer-to-peer data communication session and determine to pause the peer-to-peer data communication session. The AP 112 may be configured to transmit a frame indicating the pause to the peer wireless station. Further, the AP 112 may be configured to receive an acknowledgement from the peer wireless station. In some embodiments, the frame may include a transmission pause field and/or a time duration field. The time duration field may indicate a length of the pause in the peer-to-peer data communication session. In some embodiments, the frame may be a Wi-Fi control frame or a Wi-Fi management frame. In some embodiments, the AP 112 may be configured to transmit a trigger frame to the peer wireless station to indicate resumption of the peer-to-peer data communication session. In some embodiments, the trigger frame may be a Wi-Fi control frame or a Wi-Fi management frame.

Figure 3:
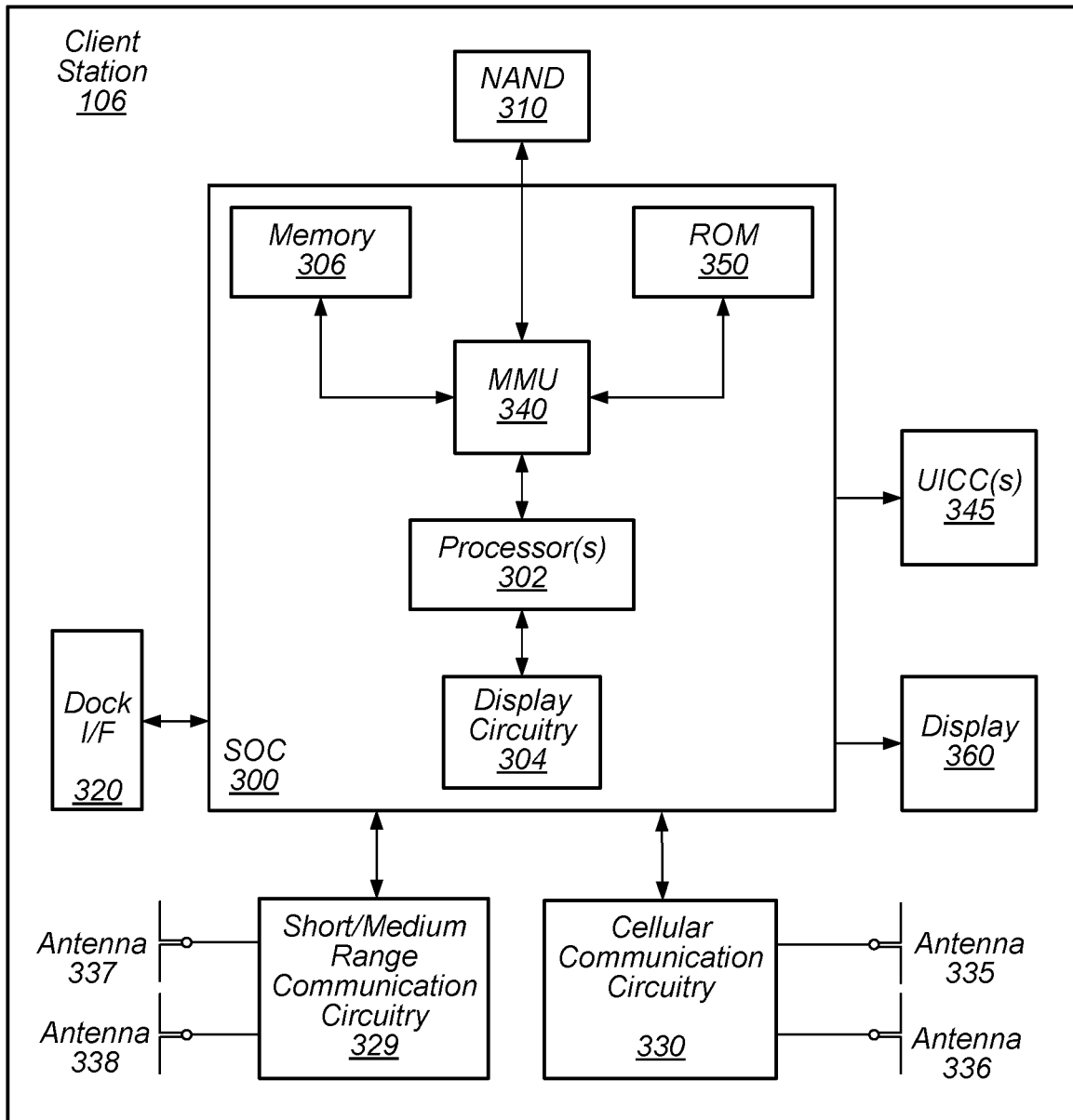
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to establish, with a peer wireless station, a peer-to-peer data communication session and determine to pause the peer-to-peer data communication session. The client station 106 may be configured to transmit a frame indicating the pause to the peer wireless station and receive an acknowledgement from the peer wireless station. In some embodiments, the frame may include a transmission pause field and/or a time duration field. The time duration field may indicate a length of the pause in the peer-to-peer data communication session. In some embodiments, the frame may be a Wi-Fi control frame or a Wi-Fi management frame. In some embodiments, the client station 106 may be configured to transmit a trigger frame to the peer wireless station to indicate resumption of the peer-to-peer data communication session. In some embodiments, the trigger frame may be a Wi-Fi control frame or a Wi-Fi management frame.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure that devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). The NAN protocol also may incorporate additional aspects. NAN 1.0 describes methods for NAN protocol synchronization and discovery. After two wireless stations have discovered each other (per NAN 1.0) they may implement a procedure to setup a NAN datapath between them so that they can communicate. After this, the two wireless stations arrange for a common datapath negotiation window so that they can negotiate capabilities, synchronization requirements, and/or exchange further service information (e.g., per NAN 2.0). The datapath negotiation window is a time window that enables two wireless stations to communicate with each other so that they can negotiate capabilities and/or synchronization requirements, and exchange further service information. Once the datapath negotiation window has been established and NAN datapath setup has been performed, the wireless stations may perform datapath synchronization to help ensure that the two stations stay synchronized with each other for communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods (and/or mechanisms) for a wireless station (including, but not limited to, a NAN device) to notify neighboring wireless station of a pause in transmissions, e.g., due to a tune away or co-existence event.

Peer-to-Peer Transmission Pause Indication

In some implementations, a wireless station may have multiple radios operating on the same band. For example, Wi-Fi and Bluetooth may operate in the 2.4 GHz band. Similarly, Wi-Fi and Licensed Assisted Access (LAA) LTE may both operate in the 5 GHz band. In typical implementations, a wireless station, while in a Wi-fi infrastructure mode, may assume that an access point is always available (e.g., "always on") on an infrastructure channel and the wireless station may use one or more power savings schemes or mechanisms to put the access point "on hold" when a coexistence event occurs (e.g., when the wireless station needs to switch to a non-Wi-Fi radio). However, when the wireless station is in a Wi-Fi peer-to-peer communication mode, the wireless station may not be able to put the peer station "on hold." In other words, the wireless station and the peer wireless station may both need to manage coexistence events. Further, the wireless station may have multiple Wi-Fi peer-to-peer communication sessions at once (e.g., concurrently), thus the wireless station may need to manage both its own coexistence events as well as be aware of coexistence events for multiple peer stations.

Figure 4:
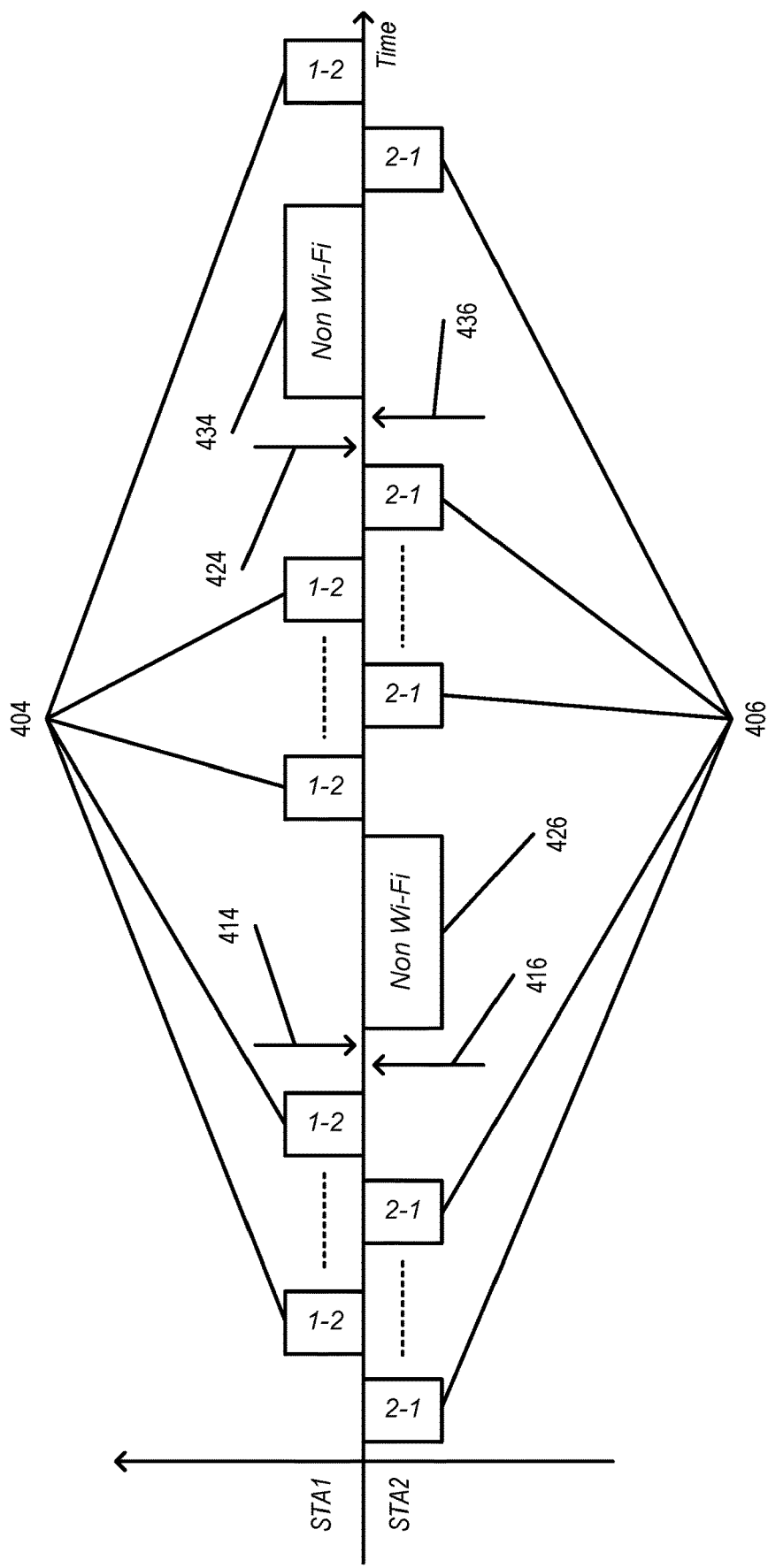
FIG. 4 illustrates an example implementation for a Wi-Fi peer-to-peer communication session.

For example, FIG. 4 illustrates a typical implementation for a Wi-Fi peer-to-peer communication session. As shown, peer wireless stations (e.g., STA1 and STA2) may exchange communications (e.g., messages 404 from STA1 to STA2 and messages 406 from STA2 to STA1). Further, when STA2 becomes aware of a coexistence event, STA2 may notify STA1 via a pause indication (e.g., indication 416). Once the pause indication is acknowledged (acknowledgment 414), STA2 may switch to a non-Wi-Fi radio and perform non-Wi-Fi activities/communications 426. Similarly, when STA1 becomes aware of a coexistence event STA1 may notify STA2 via a pause indication (e.g., indication 424) and once the pause indication is acknowledged (acknowledgment 436), STA1 may switch to a non-Wi-Fi radio and perform non-Wi-Fi activities/communications 434.

Figure 5:
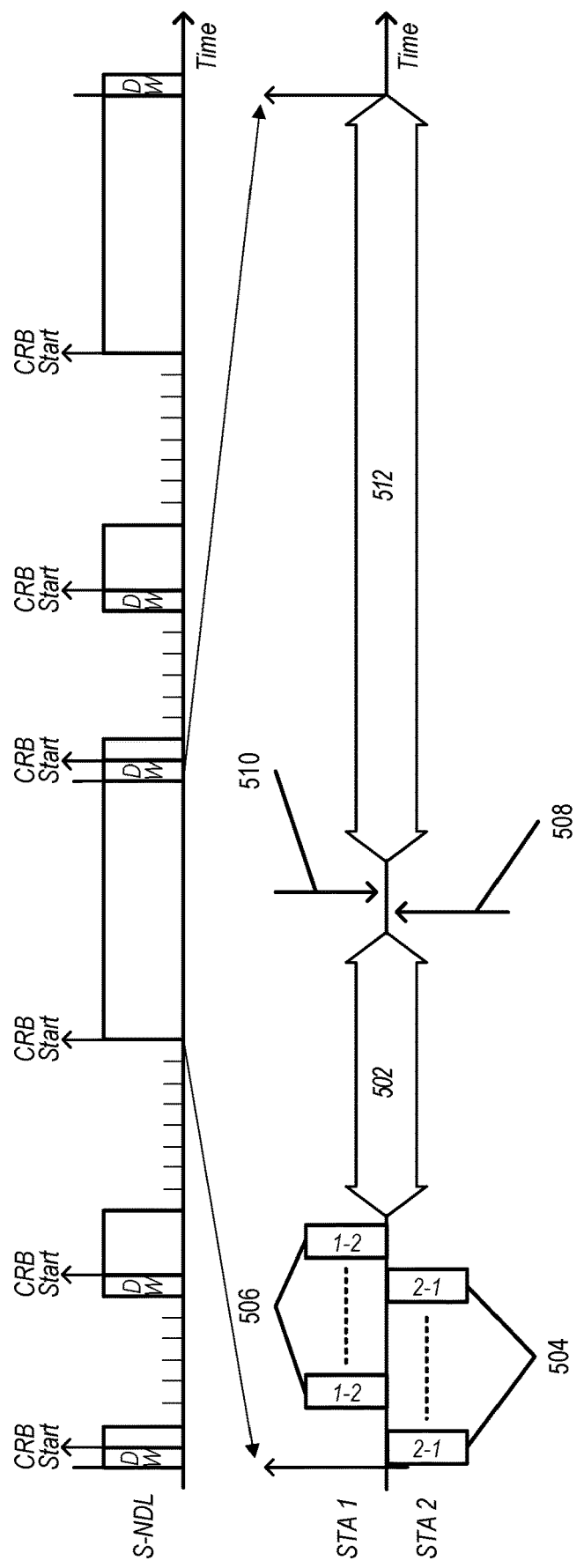
FIG. 5 illustrates a NAN communication timeline between two wireless stations (STA1, STA 2) that have established a synchronization NAN data link (S-NDL).

In some implementations, a peer-to-peer power saving scheme may allow peer wireless stations to enter a power savings mode when all data for a transmission interval is exhausted. For example, FIG. 5 illustrates a NAN communication timeline between two wireless stations (STA1, STA 2) that have established a synchronization NAN data link (S-NDL). As shown, in such a scenario, both stations may be awake at the beginning of each common resource block (CRB), e.g., overlapped portions of further availability windows (FAWs) between multiple wireless stations, and may be able to start transmitting data to each other immediately (e.g., without paging and triggering). In other words, after each discovery window (DW), both stations may be awake at the beginning of each CRB. Thus, as shown, STA2 may transmit data to STA1 (e.g., messages 504) and STA1 may transmit data to STA2 (e.g., messages 506). Further, either of the wireless stations may inform the other wireless station when a transmission queue has been exhausted, e.g., STA2 may inform (e.g., via indication 508, acknowledged at 510) STA1 that is has no data remaining in its buffer for transmission to STA1 (e.g., at 502). In such an instance, STA2 may begin to buffer new data destined for STA1 and request STA1 buffer any new data destined for STA2. Then, STA1 and STA2 can enter a power savings mode together (e.g., at substantially the same time) at 512 and then exit the power savings mode together at an agreed upon time to continue data transfer.

Such a scheme, however, may be inefficient for coexistence events which typically last much shorter durations as compared to power savings events (e.g., as illustrated by FIG. 5). In other words, in a power savings event, a remaining portion of a CRB may be skipped, whereas, a coexistence event will typically last for a much shorter duration. Note that skipping a remaining portion of a CRB for a short coexistence event would significantly reduce the communication time between the peers.

Figure 6:
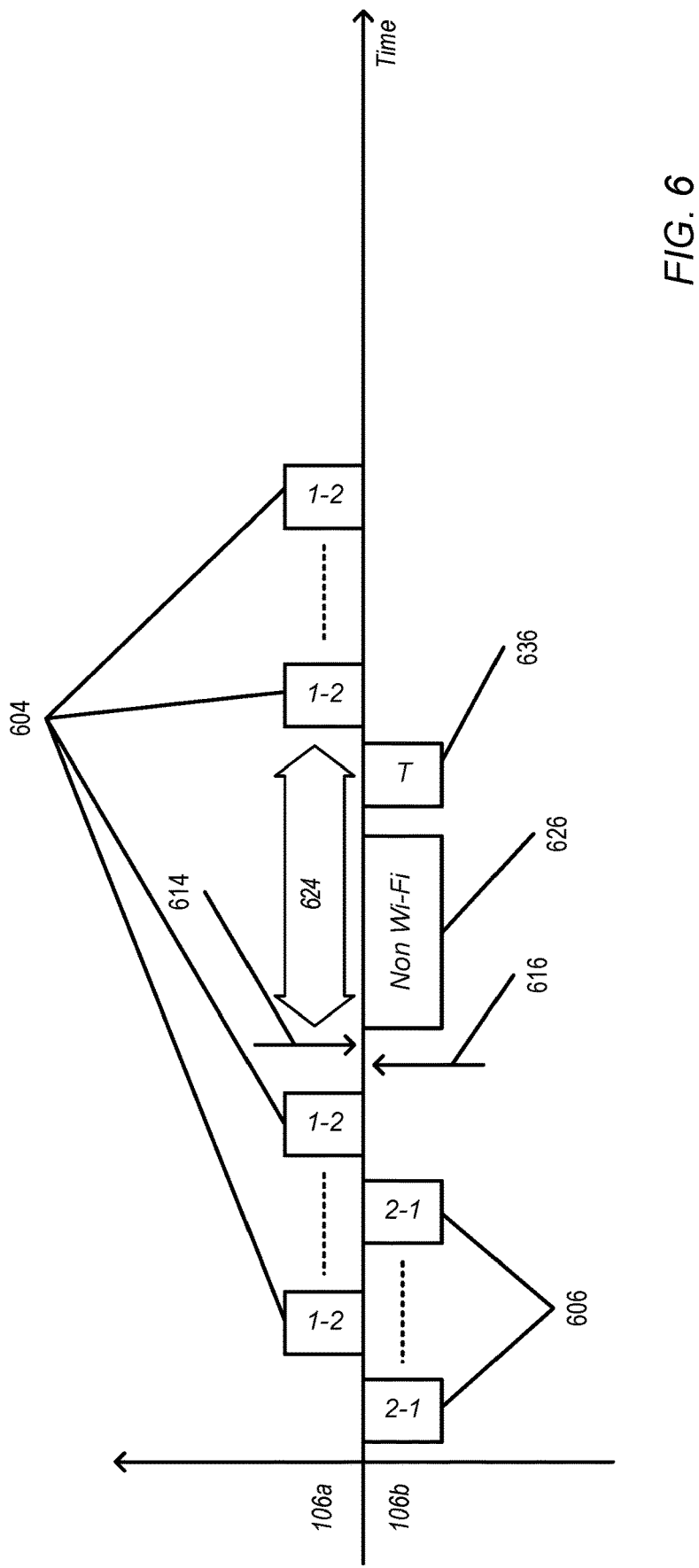
FIG. 6 illustrates an example of a Wi-Fi peer-to-peer communication session with a single station co-existence event, according to some embodiments.

In some embodiments, a wireless station, such as client station 106, may inform peer wireless stations to pause transmissions to the wireless station when the wireless station has a coexistence event 626. In other words, when the wireless station needs to turn off a Wi-Fi radio for a period of time, the wireless station may inform peer wireless stations to pause transmissions 604 to the wireless station until the Wi-Fi radio is restarted. In addition, the wireless station may inform the peer wireless stations that the wireless station is pausing transmissions 606. In some embodiments, as illustrated by FIG. 6, a wireless station (e.g., 106b) may include a transmission (TX) pause flag 616 in a frame transmitted to a peer wireless station (e.g., 106a). In such embodiments, the wireless station may turn off its Wi-Fi radio (or tune away from the communication, e.g., non-Wi-Fi event 626) upon receiving an acknowledgement (ACK) 614 from the peer wireless station. In addition, once the coexistence event concludes, the wireless station may transmit a trigger frame 636 to the peer wireless station indicating that transmissions may resume.

In some embodiments, as further illustrated by FIG. 6, when the peer wireless station (e.g., 106a) receives a frame from the wireless station (e.g., 106b) with an indication to pause transmissions (e.g., a TX pause flag set as illustrated by 616), the peer wireless station may transmit the ACK 614 to the wireless station and discontinue any pending transmission to the peer wireless station (e.g., enter a TX pause state 624). In addition, the wireless station may not enter a power savings mode during scheduled and committed availability windows, e.g., during TX pause state 624. In other words, the peer wireless station may remain available for all scheduled times as negotiated with the wireless station, whether or not the wireless station has paused transmissions. In some embodiments, if the pause indication frame 616 also includes a pause time duration, the peer wireless station may enter a nap mode (e.g., a power savings mode that is shorter in duration than a standard power savings mode), and wake up before the end of the pause time duration. In some embodiments, the peer wireless station may resume transmissions 604 with the wireless station upon receipt of a trigger frame 636 from the wireless station.

Figure 7:
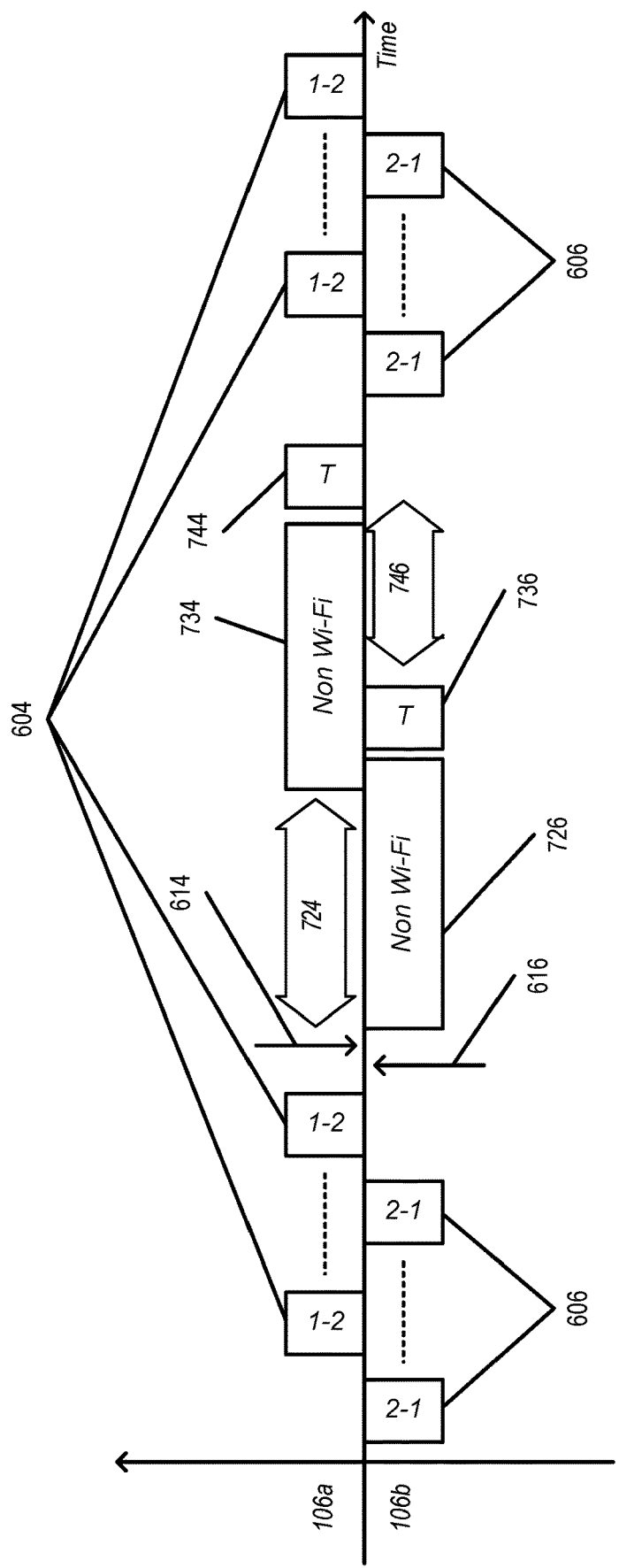
FIG. 7 illustrates an example of a Wi-Fi peer-to-peer communication session with multiple station co-existence events, according to some embodiments.

In some embodiments, a wireless station, such as client station 106a, may have a coexistence event during a TX pause state (e.g., upon receiving a request to pause transmissions to a peer wireless station). In other words, the wireless station 106a may need to turn off a Wi-Fi radio for a period of time while waiting for a peer wireless station 106b to return from a coexistence event. In such embodiments, transmissions between the wireless station and peer wireless station may not resume until both stations have transmitted a trigger frame to the other station. For example, as illustrated by FIG. 7, a peer wireless station (e.g., 106b) may transmit a frame with a TX pause indication 616 to the wireless station (e.g., 106a). Upon receipt of the frame with the TX pause indication 616, the wireless station may transmit an ACK 614 to the peer wireless station, at which point the peer wireless station may enter a coexistence event 726 (e.g., non-Wi-Fi communications). Further, during the peer wireless station's coexistence event, the wireless station may pause transmissions at 724 and then enter a coexistence event 734 as well. At the conclusion of the peer wireless station's coexistence event, the peer wireless station may transmit a trigger frame 736 to the wireless station. After transmission of the trigger frame 736, but not reception of an acknowledgement, the peer wireless station may not enter a power savings mode and may wait for a trigger frame from the wireless station, e.g., at 746. At the conclusion of the wireless station's coexistence event 734, the wireless station may transmit a trigger frame 744 to the peer wireless station and communication between the stations may resume.

In some embodiments, a trigger frame (e.g., 636, 736, 744) may be a Wi-Fi control frame and/or a Wi-Fi management frame, e.g., to avoid impacting rate adaptation for data frame transmissions. In some embodiments, a wireless station may transmit trigger frames to a peer wireless station multiple times if it does not receive an acknowledgement from the peer wireless station. In such embodiments, the wireless station may not enter a power savings mode and may continue to wait for a response (e.g., a trigger frame and/or an acknowledgement frame) from the peer wireless station.

Figure 8:
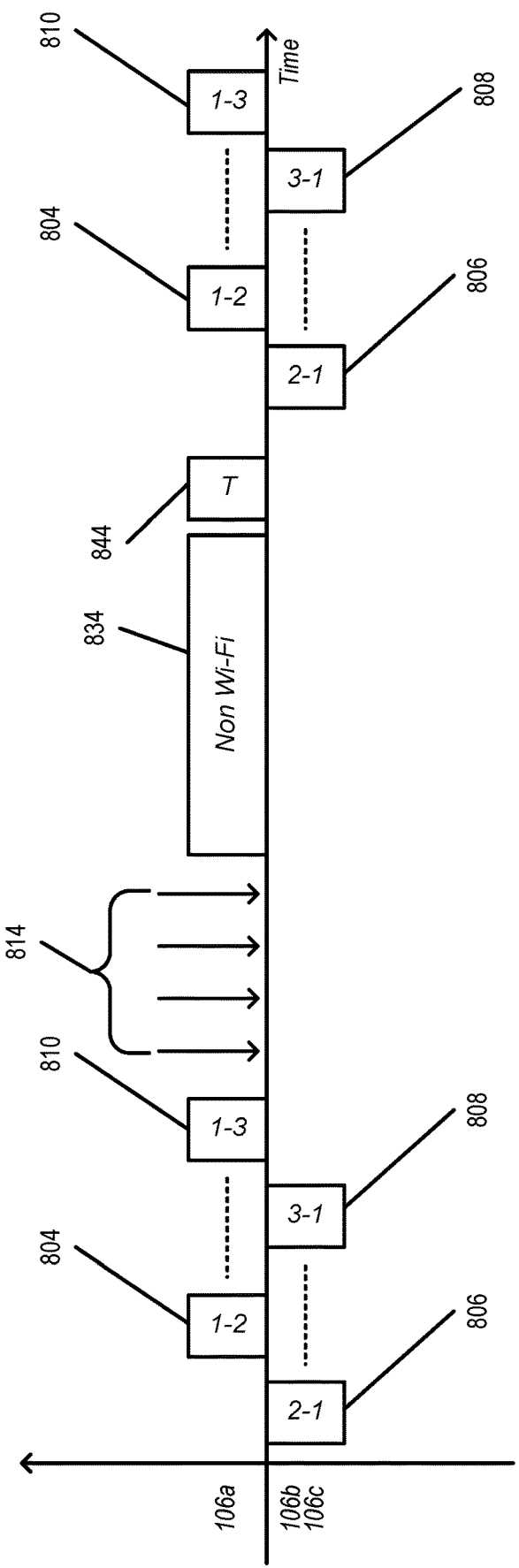
FIG. 8 illustrates an example of multiple Wi-Fi peer-to-peer communication sessions with a single station co-existence event, according to some embodiments.

In some embodiments, if a wireless station, such as wireless station 106, has multiple active peer wireless stations (e.g., if the wireless station has substantially concurrent peer-to-peer communication sessions with multiple peer wireless station), the wireless station may broadcast a frame that includes a TX pause indication (e.g., frames 814) that is receivable by the multiple active peer wireless stations, e.g., as illustrated FIG. 8. In such embodiments, the frame may be transmitted in a Wi-Fi control frame and/or Wi-Fi management frame. In some embodiments, the wireless station (e.g., wireless station 106a) may broadcast the frame 814 multiple times. In some embodiments, the frame may include an indication of a duration of pause (e.g., in a time duration field of the frame). In some embodiments, upon receipt of the frame 814, the active peer wireless stations (e.g., wireless stations 106b and 106c transmitting data 806 and 808, respectively to wireless station 106a and receiving data 804 and 810, respectively, from wireless station 106a) may discontinue pending transmissions to the wireless station and may not enter a power savings mode. In some embodiments, if the pause indication frame includes a pause time duration, the peer wireless stations may enter a nap mode, and wake up before the end of the pause time duration.

In some embodiments, once the wireless station's coexistence event concludes (e.g., non-Wi-Fi event 834), the wireless station may broadcast a trigger frame 844 (e.g., as described above) one or more times and wait for transmissions from the active peer wireless stations (e.g., stations 106b and 106c). In some embodiments, once the wireless station's coexistence event concludes, the wireless station may transmit a trigger frame 844 (e.g., as described above) to each active peer wireless station and wait for a transmission from each active peer wireless station. Note that in some embodiments, the wireless station broadcast the trigger frame 844 and/or transmit the trigger frame 844 to individual active peer wireless station.

In some embodiments, the wireless station may resume communications with an active peer wireless station upon receipt of a transmission from the active peer wireless station. In other words, the wireless station may resume communication with the active peer wireless station upon receipt of a trigger frame and/or upon receipt of data from the active peer wireless station.

FIG. 9 illustrates a block diagram of an example of a method for pausing a peer-to-peer data communication session, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a wireless station, such as wireless station 106 (and/or circuitry and/or a processor(s) of wireless station 106) may establish, with a peer wireless station, a peer-to-peer data communication session. In some embodiments, communications for the peer-to-peer data communication session may be performed via at least one radio of the wireless station. In some embodiments, communications the peer-to-peer data communication session may be performed according to a Wi-Fi peer-to-peer protocol such as Neighbor Awareness Networking (NAN) and/or Wi-Fi Direct, among other Wi-Fi peer-to-peer protocols.

At 904, the wireless station may determine to pause the peer-to-peer data communication session with the peer wireless station. In some embodiments, determining to pause the peer-to-peer data communication session may be based on (at least in part) determining to switch the at least one radio from Wi-Fi communications to one of Bluetooth or cellular communications. In other words, in some embodiments, to determine to pause the peer-to-peer data communication session, the wireless station may determine to switch the at least one radio from Wi-Fi communications to one of Bluetooth or cellular communications (e.g., a non-Wi-Fi communication).

At 906, the wireless station may transmit a frame indicating the pause to the peer wireless station. In some embodiments, the frame may include a transmission pause field. In some embodiments, the frame may include (e.g., additionally or alternatively) a time duration field that may indicate a length of the pause in the peer-to-peer data communication session. In some embodiments, the frame may be (or be included in) a Wi-Fi control frame and/or a Wi-Fi management frame.

At 908, the wireless station may receive an acknowledgement from the peer wireless station. In some embodiments, the wireless station may switch the at least one radio from Wi-Fi communications to one of Bluetooth or cellular communications for a duration of time (e.g., in response to and/or after receiving the acknowledgement from the peer wireless station. In some embodiments, the wireless station may switch, after the duration of time, the at least one radio from one of Bluetooth or cellular communications to Wi-Fi communications and may transmit a trigger frame to the peer wireless station. In some embodiments, the trigger frame may indicate that the peer-to-peer data communication session may be resumed. In some embodiments, the trigger frame may be (or be included with) a Wi-Fi control frame and/or a Wi-Fi management frame, e.g., to avoid impacting rate adaptation for data frame transmissions.

In some embodiments, the wireless station may establish one or more additional peer-to-peer communication data sessions with one or more additional peer wireless stations. In some embodiments, communications the peer-to-peer data communication session may be performed according to a Wi-Fi peer-to-peer protocol such as Neighbor Awareness Networking (NAN) and/or Wi-Fi Direct, among other Wi-Fi peer-to-peer protocols. In such embodiments, to transmit a frame indicating the pause to the peer wireless station, the wireless station may transmit the frame to the peer wireless station and the one or more addition peer wireless stations. In some embodiments, to transmit the frame to the peer wireless station and the one or more addition peer wireless stations, the wireless station may broadcast the frame to the peer wireless station and the one or more additional peer wireless stations. In some embodiments, the frame may be (or be included in) one of a Wi-Fi control frame and/or a Wi-Fi management frame.

FIG. 10 illustrates a block diagram of an example of a method for pausing multiple peer-to-peer data communication sessions, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a wireless station, such as wireless station 106 (and/or circuitry and/or a processor(s) of wireless station 106) may establish, with each of one or more peer wireless stations, a peer-to-peer data communication session. In some embodiments, communications for each of the peer-to-peer data communication sessions may be performed via at least one radio of the wireless station. In some embodiments, communications for each of the peer-to-peer data communication sessions may be performed according to a Wi-Fi peer-to-peer protocol such as Neighbor Awareness Networking (NAN) and/or Wi-Fi Direct, among other Wi-Fi peer-to-peer protocols.

At 1004, the wireless station may determine to pause each of the peer-to-peer data communication sessions. In some embodiments, determining to pause each of the peer-to-per data communication sessions may be based (at least in part) on determining to switch the at least one radio from Wi-Fi communications to one of Bluetooth or cellular communications. In other words, in some embodiments, to determine to pause each of the peer-to-peer data communication sessions, the wireless station may determine to switch the at least one radio from Wi-Fi communications to one of Bluetooth or cellular communications (e.g., a non-Wi-Fi communication).

At 1006, the wireless station may transmit a frame indicates the pause to the one or more peer wireless stations. In some embodiments, the frame may include a transmission pause field. In some embodiments, the frame may include (e.g., additionally or alternatively) a time duration field that may indicate a length of the pause in each of the peer-to-peer data communication sessions. In some embodiments, the frame may be (or be included in) a Wi-Fi control frame and/or a Wi-Fi management frame.

At 1008, the wireless station may transmit, after the pause, a trigger frame to the one or more peer wireless stations. In some embodiments, the trigger frame may indicate the wireless station can resume each of the peer-to-peer data communication sessions. In some embodiments, to transmit the trigger frame, the wireless station may broadcast the trigger frame to the one or more peer wireless stations. In some embodiments, the trigger frame may be (or be included in) a Wi-Fi control frame and/or a Wi-Fi management frame.

Figure 11:
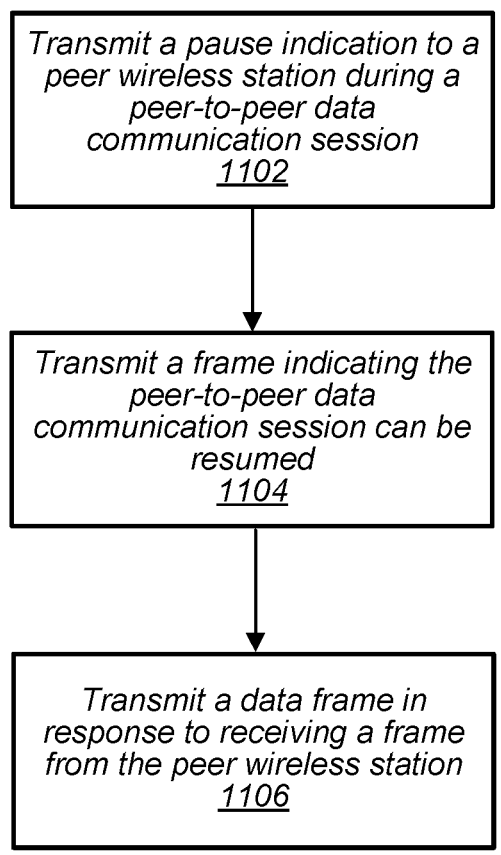
FIG. 11 illustrates a block diagram of another example of a method for pausing a peer-to-peer data communication session, according to some embodiments.

FIG. 11 illustrates a block diagram of another example of a method for pausing a peer-to-peer data communication session, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a wireless station, such as wireless station 106 (and/or circuitry and/or a processor(s) of wireless station 106) may transmit a first frame indicating a pause a peer-to-peer data communication session with a peer wireless station. In some embodiments, the first frame may include one or more of a transmission pause field or a time duration field and the time duration field may indicate a length of the pause in the peer-to-peer data communication session. In some embodiments, the wireless station may switch from Wi-Fi communications to one of Bluetooth or cellular communications during the pause. In some embodiments, the first frame may be one of (or be included in) a Wi-Fi control frame and/or a Wi-Fi management frame.

In some embodiments, the pause may be based, at least in part on, a determination by the wireless station, during the peer-to-peer data communication session, that the wireless station does not currently have data to transmit to the peer wireless station. In other words, the wireless station may determine that there is currently no data to transmit to the peer wireless station during the peer-to-peer data communication session. In some embodiments, the peer-to-peer data communication session may have been established (e.g., prior to transmission of the first frame indicating the pause) according to a Wi-Fi peer-to-peer communications protocol. In some embodiments, the Wi-Fi peer-to-peer communications protocol may be one of Neighbor Awareness Networking (NAN) and/or Wi-Fi Direct, among other Wi-Fi peer-to-peer protocols.

At 1104, the wireless station may transmit a second frame indicating the wireless station can resume the peer-to-peer data communication session. In some embodiments, the second frame may be a trigger frame indicating that the wireless station can resume the peer-to-peer data communication session. In some embodiments, the second frame may be one of (or be included in) a Wi-Fi control frame and/or a Wi-Fi management frame.

At 1106, the wireless station may transmit a data frame to the peer wireless station. In some embodiments, the transmission of the data frame may be in response to the wireless station receiving a third frame from the peer wireless station. In some embodiments, the third frame may be a trigger frame indicating that the peer wireless station can resume the peer-to-peer data communication session. In some embodiments, the third frame may be an acknowledgement frame. In some embodiments, the third frame may be a data frame. In some embodiments, the trigger and/or acknowledgement frame may be one of (or be included in) a Wi-Fi control frame and/or a Wi-Fi management frame.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform communications via a Wi-Fi interface; and
   at least one processor in communication with the at least one radio;
   wherein the at least one processor is configured to cause the wireless station to:
   establish peer-to-peer data communication sessions with at least two peer wireless stations;
   determine to pause the peer-to-peer data communication sessions;
   transmit a frame indicating the pause to the peer wireless stations; and
   receive acknowledgements from the peer wireless stations.

2. The wireless station of claim 1,
   wherein, to determine to pause the peer-to-peer data communication sessions, the at least one processor is further configured to cause the wireless station to:
   determine to switch the at least one radio from Wi-Fi communications to one of Bluetooth or cellular communications.

3. The wireless station of claim 1,
   wherein the frame includes a transmission pause field.

4. The wireless station of claim 1,
   wherein the frame includes a time duration field that indicates a length of the pause in the peer-to-peer data communication sessions.

5. The wireless station of claim 1,
   wherein the frame comprises one of a Wi-Fi control frame or a Wi-Fi management frame.

6. The wireless station of claim 1,
   wherein, in response to receiving the acknowledgements, the at least one processor is further configured to cause the wireless station to:
   switch the at least one radio from Wi-Fi communications to one of Bluetooth or cellular communications for a duration of time;
   switch, after the duration of time, the at least one radio back to Wi-Fi communications; and
   transmit a trigger frame to the peer wireless stations, wherein the trigger frame indicates that the peer-to-peer data communications session can resume.

7. The wireless station of claim 1,
   wherein, to transmit the frame to the peer wireless stations, the at least one processor is further configured to cause the wireless station to:
   broadcast the frame to the peer wireless stations, wherein the frame comprises one of a Wi-Fi control frame or a Wi-Fi management frame.

8. An apparatus, comprising:
   a memory; and
   at least one processor in communication with the memory, wherein the at least one processor is configured to:
   generate instructions to establish peer-to-peer data communication sessions with two or more peer wireless stations;
   determine to pause the peer-to-peer data communication sessions;
   generate instructions to transmit a frame to the two or more peer wireless stations, wherein the frame indicates the pause; and
   generate instructions to transmit, after the pause, a trigger frame to the two or more peer wireless stations, wherein the trigger frame indicates resumption of the paused peer-to-peer data communication sessions.

9. The apparatus of claim 8,
   wherein, to generate instructions to transmit the frame to the two or more peer wireless stations, the at least one processor is further configured to generate instructions to broadcast the frame to the two or more peer wireless stations.

10. The apparatus of claim 8, wherein the frame comprises one of a Wi-Fi control frame or a Wi-Fi management frame.

11. The apparatus of claim 8, wherein the frame includes one or more of a transmission pause field or a time duration field.

12. The apparatus of claim 8, wherein the trigger frame comprises one of a Wi-Fi control frame or a Wi-Fi management frame.

13. The apparatus of claim 8, wherein at least one of the peer-to-peer data communication sessions is established according to the Neighbor Awareness Networking protocol.

14. A non-transitory computer readable memory medium storing program instructions executable by processing circuitry to cause a wireless station to:
   generate instructions to transmit, via at least one radio, a first frame indicating a pause in a peer-to-peer data communication session with a peer wireless station, wherein the peer-to-peer data communication session is established according to a Wi-Fi peer-to-peer communications protocol via the at least one radio of the wireless station; and
   wherein the pause is based, at least in part on, determining there is currently no data to transmit to the peer wireless station during the peer-to-peer data communication session;
   generate instructions to transmit, via the at least one radio, a second frame indicating that the wireless station can resume the peer-to-peer data communication session; and
   generate instructions to transmit, via the at least one radio, a data frame to the peer wireless station in response to receiving, via the at least one radio, a third frame from the peer wireless station.

15. The non-transitory computer readable memory medium of claim 14, wherein the third frame comprises one of a trigger frame or a data frame.

16. The non-transitory computer readable memory medium of claim 14, wherein the Wi-Fi peer-to-peer communications protocol is the Neighbor Awareness Networking protocol.

17. The non-transitory computer readable memory medium of claim 14, wherein the first frame comprises at least a transmission pause field or a time duration field, wherein the time duration field indicates a length of the pause in the peer-to-peer data communication session.

18. The non-transitory computer readable memory medium of claim 14, wherein, during the pause, the program instructions are further executable to:
   generate instructions to switch the at least one radio from Wi-Fi communications to one of Bluetooth or cellular communications.

19. The non-transitory computer readable memory medium of claim 14, wherein each of the first and second frames comprise one of a Wi-Fi control frame or a Wi-Fi management frame.

20. The wireless station of claim 1, wherein, to determine to pause the peer-to-peer data communication sessions, the at least one processor is further configured to cause the wireless station to determine that there is currently no data to transmit to the peer wireless stations during the peer-to-peer data communication sessions.

* * * * *